United States Patent
Hoyer et al.

(10) Patent No.: US 12,319,107 B2
(45) Date of Patent: Jun. 3, 2025

(54) VEHICLE RIDE HEIGHT ADJUSTMENT SYSTEM

(71) Applicant: GM GLOBAL TECHNOLOGY OPERATIONS LLC, Detroit, MI (US)

(72) Inventors: Eric B. Hoyer, White Lake, MI (US); George Floarea, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/330,528

(22) Filed: Jun. 7, 2023

(65) Prior Publication Data

US 2024/0408928 A1    Dec. 12, 2024

(51) Int. Cl.
    *B60G 17/017*    (2006.01)
    *B60G 7/00*    (2006.01)
    *B60G 15/06*    (2006.01)

(52) U.S. Cl.
    CPC ........... *B60G 17/017* (2013.01); *B60G 7/006* (2013.01); *B60G 15/063* (2013.01); *B60G 15/068* (2013.01); *B60G 2202/12* (2013.01); *B60G 2202/312* (2013.01); *B60G 2202/42* (2013.01); *B60G 2204/4193* (2013.01); *B60G 2500/30* (2013.01)

(58) Field of Classification Search
    CPC .... B60G 17/017; B60G 7/006; B60G 15/063; B60G 15/068; B60G 2202/42; B60G 2204/4193; B60G 2500/30
    See application file for complete search history.

(56) References Cited

U.S. PATENT DOCUMENTS

| | | | | |
|---|---|---|---|---|
| 2,998,970 | A * | 9/1961 | Davis | B60G 17/023 280/DIG. 1 |
| 4,892,328 | A * | 1/1990 | Kurtzman | F16F 15/03 188/267 |
| 7,874,561 | B2 * | 1/2011 | Michel | B60G 17/021 280/6.157 |
| 8,205,864 | B2 * | 6/2012 | Michel | H02K 41/02 280/5.514 |
| 10,619,715 | B2 * | 4/2020 | Tsai | F16H 25/20 |
| 2003/0168827 | A1 * | 9/2003 | La | F16F 9/54 280/124.135 |
| 2006/0163863 | A1 * | 7/2006 | Ellmann | B60G 15/068 280/124.179 |
| 2007/0210539 | A1 * | 9/2007 | Hakui | B60G 15/063 280/124.147 |
| 2009/0158868 | A1 * | 6/2009 | Farmer | F16H 21/24 74/49 |

(Continued)

FOREIGN PATENT DOCUMENTS

| | | |
|---|---|---|
| DE | 102016221995 A1 | 5/2018 |
| DE | 102017109046 B3 | 5/2018 |
| DE | 102017130073 B3 | 11/2018 |

OTHER PUBLICATIONS

German Office Action from counterpart DE1020231292978, dated Aug. 7, 2024.

*Primary Examiner* — Frank B Vanaman

(57) ABSTRACT

A vehicle ride height adjustment system includes a vehicle chassis. A wheel is connected to the vehicle chassis by a suspension system. A shock absorber and spring assembly are connected to the vehicle chassis and the shock absorber and spring assembly are connected to the suspension system by a height adjustment mechanism.

16 Claims, 4 Drawing Sheets

(56) References Cited

U.S. PATENT DOCUMENTS

| | | | | |
|---|---|---|---|---|
| 2009/0223322 A1* | 9/2009 | Kossira | ............... | B62D 5/0418 |
| | | | | 280/5.52 |
| 2011/0221109 A1* | 9/2011 | Hinouchi | ............. | B60G 15/063 |
| | | | | 267/221 |
| 2014/0117718 A1* | 5/2014 | Van Kaam | ........... | B62D 25/082 |
| | | | | 296/193.01 |
| 2014/0175763 A1* | 6/2014 | Kim | .................... | B60G 15/063 |
| | | | | 280/5.514 |
| 2016/0082802 A1* | 3/2016 | Izak | ........................ | B60G 3/20 |
| | | | | 280/6.157 |
| 2018/0201319 A1* | 7/2018 | Rogers | ................ | B60G 17/016 |
| 2020/0122771 A1* | 4/2020 | Ooba | ...................... | B60G 3/20 |
| 2020/0198432 A1* | 6/2020 | Tate | .................. | B60G 17/0157 |

* cited by examiner

VEHICLE RIDE HEIGHT ADJUSTMENT SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a vehicle ride height adjustment system.

From human factors perspective the height of the seats of a vehicle is important for vehicle occupants' entry/egress. Larger vehicles require running boards to help stepping up/down. When the vehicle body is lowered the seat transfer is more accessible without the need for a running board. For lower vehicles, lifting the seat (body) will make the transfer in/out easier. For accessible vehicles that are using wheelchair ramps, when the vehicle floor is lower, the ramp angle/length are decreased. A vehicle ride height adjustment system can also be used dynamically when the vehicle operates, and higher or lower ground clearance is needed.

SUMMARY

According to an aspect of the present disclosure, a vehicle ride height adjustment system includes a vehicle chassis. A wheel is connected to the vehicle chassis by a suspension system. A shock absorber and spring assembly is connected to the vehicle chassis and the shock absorber and spring assembly is connected to the suspension system by a height adjustment mechanism.

According to a further aspect, the height adjustment mechanism includes a ball screw connected to the shock absorber and a nut drivingly connected to the ball screw and drivingly connected to a drive motor.

According to a further aspect, the drive motor is drivingly connected to the nut by a spur gear system.

According to a further aspect, the spur gear system includes a first spur gear connected to an output shaft of the drive motor and a second spur gear fixed to the nut.

According to a further aspect, the spur gear system further includes a reduction gear assembly including a third spur gear in driving engagement with the first spur gear, a fourth spur gear is rotatably fixed to the third spur gear and in driving engagement with the second spur gear.

According to a further aspect, the nut is supported within a housing by a lower bearing engaging the housing and a lower portion of the nut and an upper bearing engaging the housing and an upper portion of the nut.

According to a further aspect, the drive motor is drivingly connected to the nut by a worm gear system.

According to a further aspect, the ball screw is fixed to a cylinder of the shock absorber.

According to a further aspect, the suspension system includes a lower control arm connected to the chassis and to the wheel and height adjustment mechanism is connected to the lower control arm.

According to a further aspect, the wheel is mounted to a wheel hub and the height adjustment mechanism is connected to the wheel hub.

According to another aspect, the vehicle ride height adjustment system includes a vehicle chassis. A wheel is connected to the vehicle chassis by a suspension system. A shock absorber and spring assembly is connected to the vehicle chassis and the shock absorber and spring assembly connected to the suspension system by a height adjustment mechanism that includes a ball screw connected to the shock absorber and a nut drivingly connected to the ball screw and drivingly connected to a drive motor.

The benefit of the present disclosure versus existing pneumatic systems is reduced cost, reduced weight, and reduced complexity.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
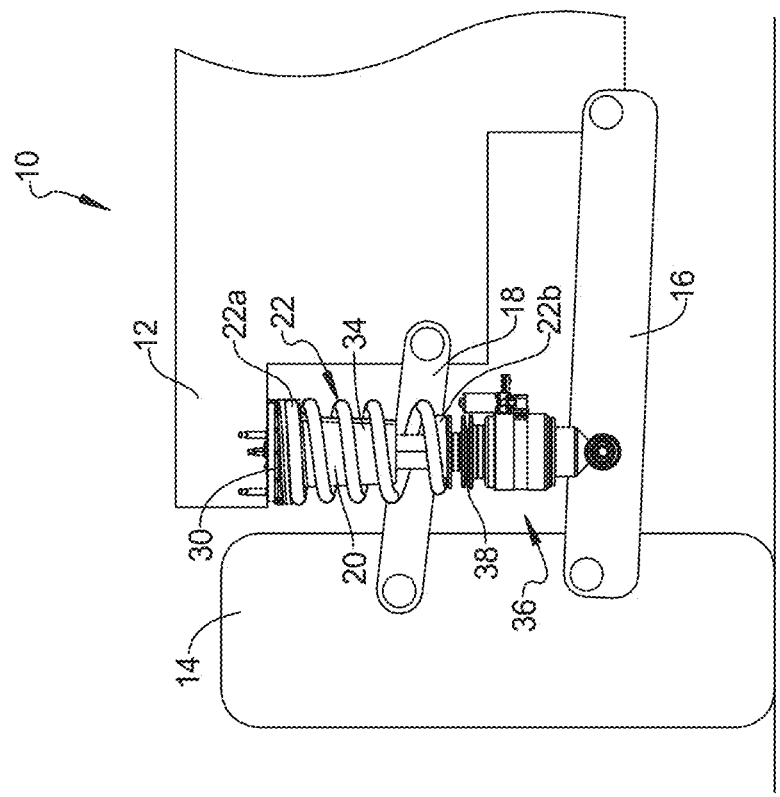
FIG. 1A is a schematic view of a vehicle ride height adjustment system in an extended position.
Figure 1B:
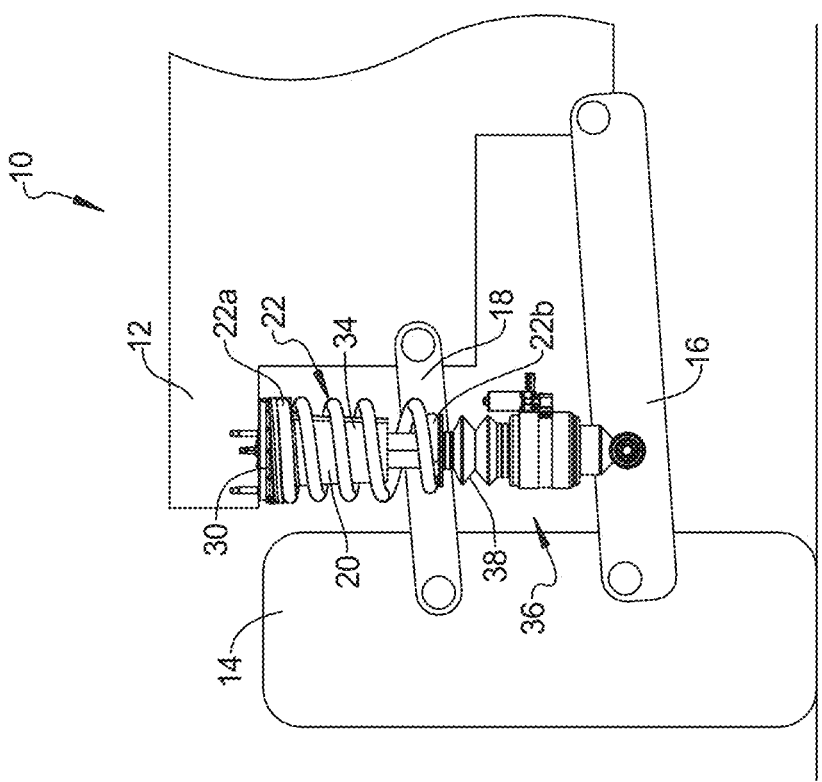
FIG. 1B is a schematic view of the vehicle ride height adjustment system in a retracted position.

With reference to FIGS. 1A and 1B, a vehicle 10 is shown including a chassis 12. A wheel 14 can be connected to the chassis 12 by a lower control arm 16 and an upper control arm 18. A shock absorber 20 and a surrounding coil spring 22 are connected to the chassis 12 at an upper end.

Figure 2A:
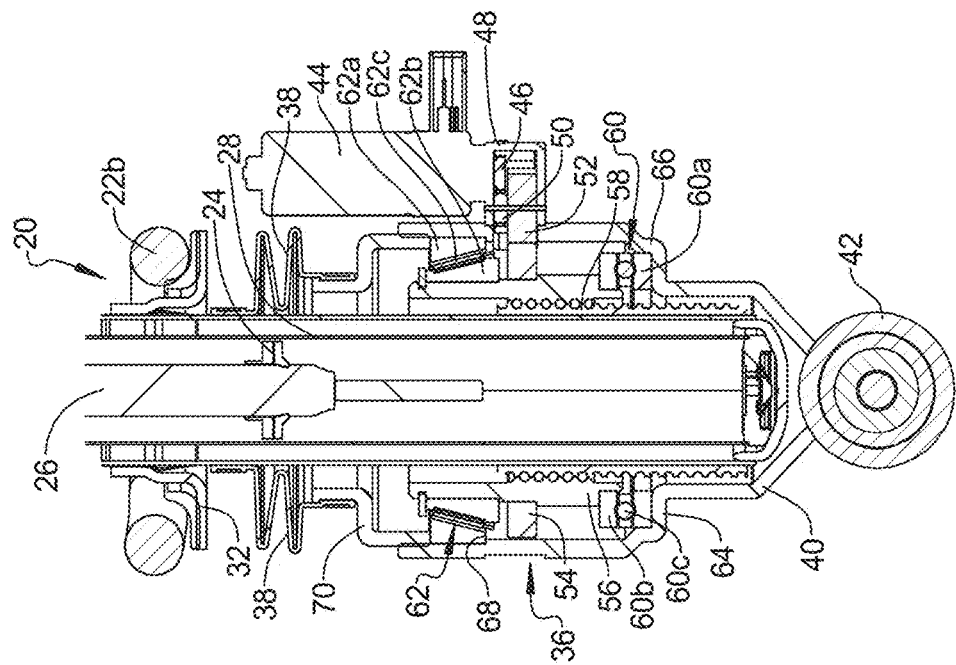
FIG. 2A is a cross-sectional view of the height adjustment mechanism in an extended position.
Figure 2B:
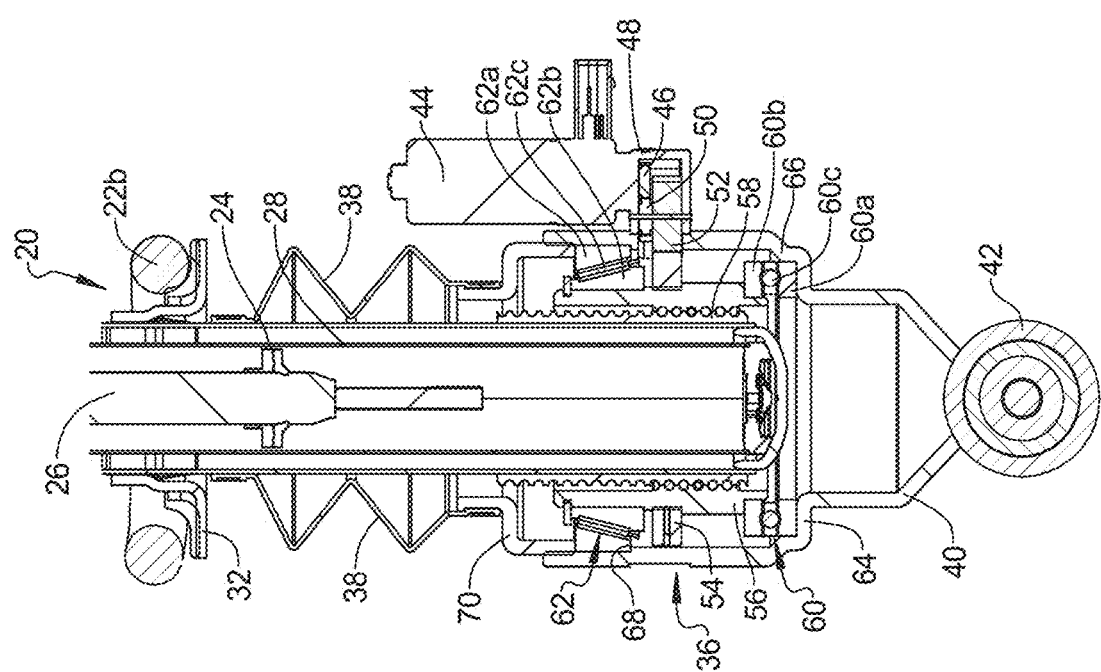
FIG. 2B is a cross-sectional view of the height adjustment mechanism in a retracted position.

As shown in FIGS. 2A and 2B, the shock absorber includes a piston 24 that is supported on a piston rod 26 and received in a cylinder 28. The piston rod 26 is connected to the chassis 12. As shown in FIGS. 1A and 1B, the upper end 22a of the spring 22 is nested in an upper spring cup 30 connected to the chassis 12. The lower end 22b of the spring 22 is nested in a lower spring cup 32 which is attached to the cylinder 28. An upper end of the cylinder 28 is received in an upper housing 34. A lower end of the cylinder 28 is connected to a ride height adjustment mechanism 36 which is connected to the lower control arm 16.

A bellows 38 is connected to an upper end of the height adjustment mechanism and to the cylinder 28. FIG. 1A shows the vehicle 10 with the height adjustment mechanism 36 extended and FIG. 1B shows the vehicle 10 with the height adjustment mechanism 36 retracted.

With reference to FIGS. 2A and 2B, the height adjustment mechanism 36 includes a housing 40 having a lower attachment portion 42 for connecting to the lower control arm 16. A motor 44 is attached to the housing 40 and includes a drive shaft 46 connected to a first spur gear 48. The first spur gear 48 is drivingly engaged with a second spur gear 50 which is rotatably fixed to a third spur gear 52. The second and third spur gears 50, 52 are rotatably supported by the housing 40. The third spur gear 52 can be larger in diameter than the second spur gear 50 in order to provide a gear reduction. The third spur gear 52 is in driving engagement with a fourth spur gear 54 that is fixed to a nut 56. The nut 56 is engaged with a ball screw 58 that is fixed to a bottom portion of the cylinder 28 of shock absorber 20. The nut 56 is rotatably supported in the housing 40 by a lower bearing 60 and an upper bearing 62. The lower bearing 60 includes a lower race 60a is disposed against a first axially facing shoulder 64 and a radially inwardly facing shoulder 66 of the housing 40 and an upper race 60b engaging a lower portion of the nut 56 with a plurality of ball bearings 60c disposed axially between the lower race 60a and the upper race 60b. The upper bearing 62 having an outer diagonal race 62a disposed against a second axially facing shoulder 68 of the housing 40 and an inner diagonal race 62b engaging an upper portion of the nut 56 with a plurality of bearing members 62c disposed between the inner diagonal race 62b and the outer diagonal race 62a. A cap 70 can be threadedly engaged with the housing 40 and can be disposed against an upper surface of the outer diagonal race 62a of the upper bearing 62 to provide axial support for the upper bearing 62. The bellows 38 can be attached to an upper end of the cap 70. The motor 44 drives the nut 56 to drive the ball screw 58 in a vertical direction. FIG. 2A shows the height adjustment mechanism 36 and bellows 38 extended and FIG. 2B shows the height adjustment mechanism 36 and bellows 38 retracted. The housing 40 includes an elongated cavity for receiving the lower end of the cylinder 28 to varying degrees as the height adjustment mechanism 36 is operated to adjust a vehicle ride height.

Figure 4:
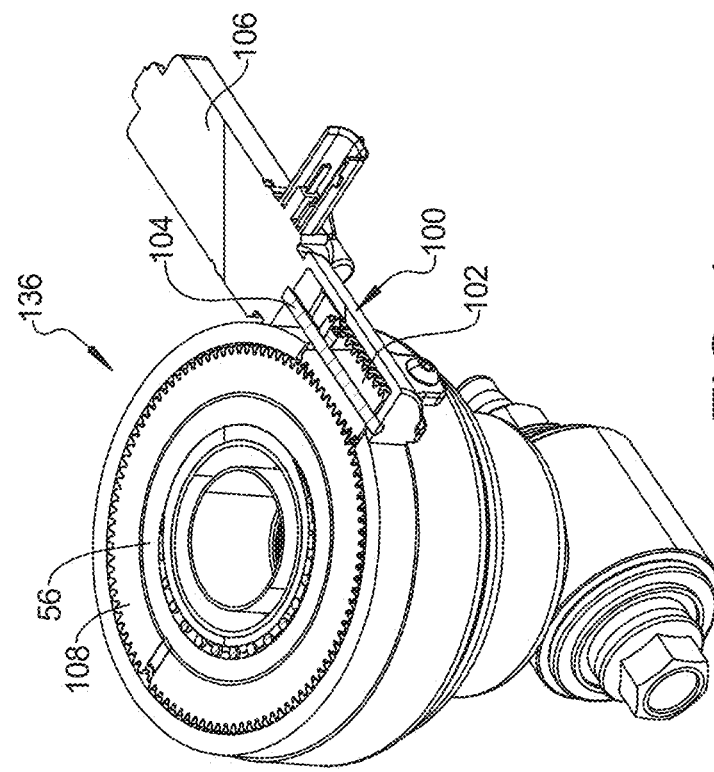
FIG. 4 is a cut-away perspective view of the height adjustment mechanism shown in FIG. 3.
Figure 3:
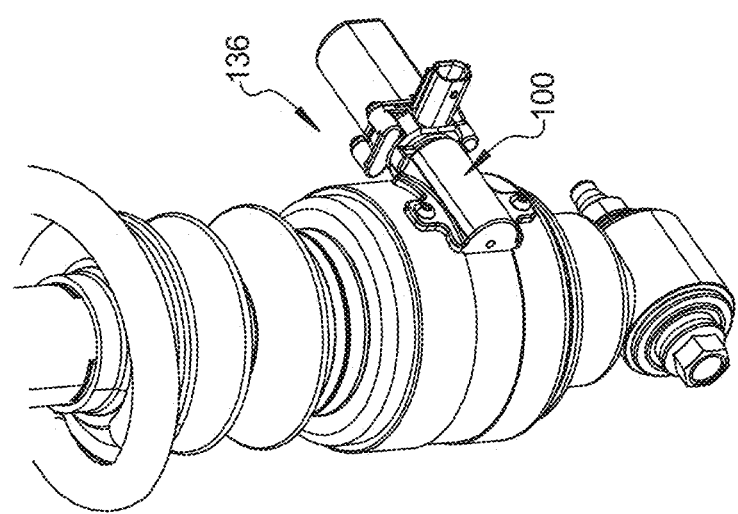
FIG. 3 is a partial perspective view of a shock absorber having a height adjustment mechanism according to a second embodiment.

The drive mechanism of the height adjustment mechanism 136 can alternatively include a worm gear drive system 100 as shown in FIGS. 3 and 4. In particular, the worm drive system 100 includes a worm gear 102 mounted to a drive shaft 104 of the motor 106. The worm gear 102 is in engagement with a worm wheel 108 that is fixed to the nut 56.

Figure 5:
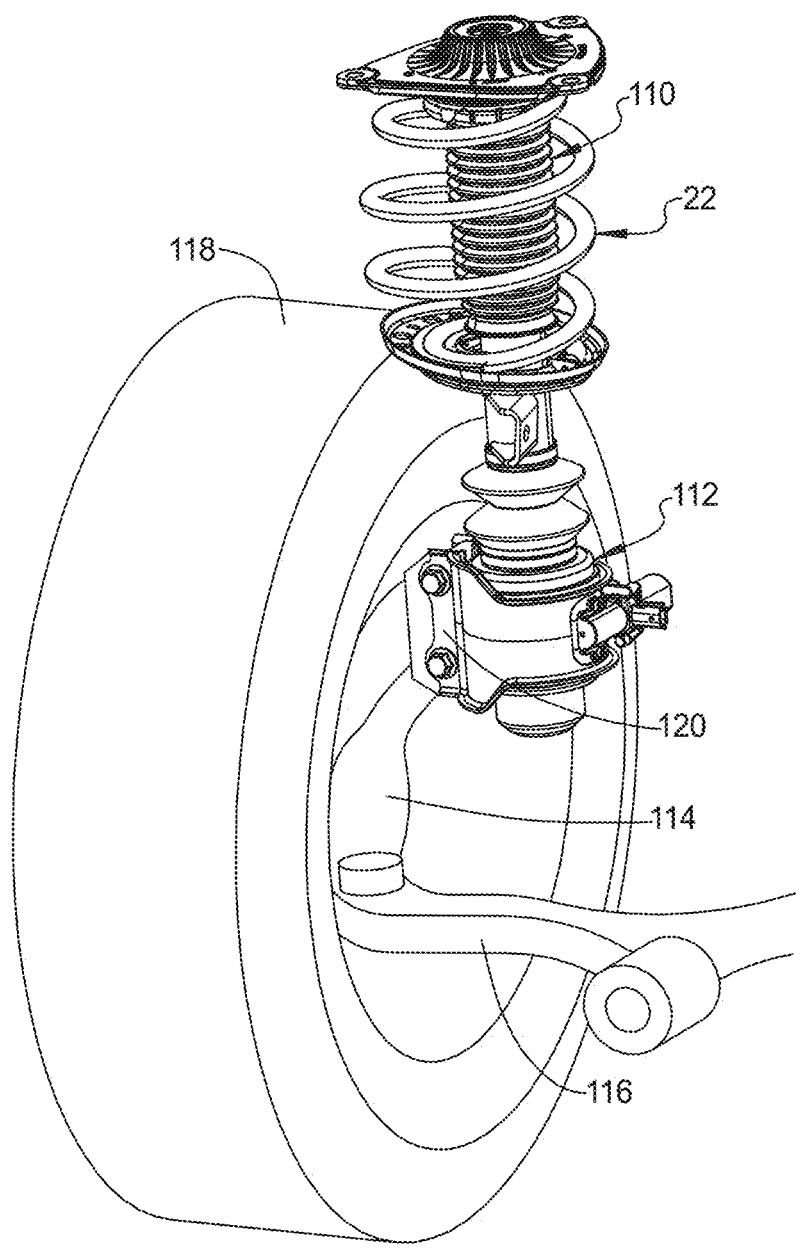
FIG. 5 is a perspective view of a MacPherson strut having a height adjustment mechanism according to the principles of the present disclosure.

With reference to FIG. 5, the shock absorber 110 and height adjustment mechanism 112 can be utilized as a MacPherson strut that is mounted to a wheel hub 114. The MacPherson strut uses a wishbone 116 which provides a mounting point for the hub carrier 114 or axle of the wheel 118. The lower wishbone 116 provides both lateral and longitudinal location of the wheel 118. The upper part of the hub 114 is rigidly fixed to the side bracket 120 of the height adjustment mechanism 112. The height adjustment mechanism 112 can include a spur gear system or a worm gear system as described above.

The proposed system will be able to lower or lift the body of a vehicle. The shock (and the spring) is moved down/up with respect to the lower control arm, the vehicle body will also move down/up balancing out in a new location. When the height adjustment mechanism is applied at the four corners of the vehicle, the vehicle body will drop/lift accordingly consistent at all four corners. Accordingly, the height adjustment mechanism allows the shock and coil to move up or down relative to the control arm or the wheel in the case of a MacPherson strut.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A vehicle ride height adjustment system, comprising:
   a vehicle chassis;
   a wheel connected to the vehicle chassis by a suspension system; and
   a shock absorber and spring assembly connected to the vehicle chassis and the shock absorber and spring assembly connected to the suspension system by a height adjustment mechanism including a ball screw connected to the shock absorber and a nut drivingly connected to the ball screw and drivingly connected to a drive motor, wherein the nut is supported within a housing by a lower bearing assembly having a lower race engaging the housing and an upper race engaging a lower portion of the nut with a plurality of ball bearings disposed axially between the lower race and the upper race and an upper bearing assembly having an outer diagonal race having an outer surface directly engaging the housing and an inner diagonal race surrounding and directly engaging a cylindrical radially outer surface of an upper portion of the nut with a plurality of bearing members disposed radially between the inner diagonal race and the outer diagonal race inner race of the upper bearing assembly.

2. The vehicle ride height adjustment system according to claim 1, wherein the drive motor is drivingly connected to the nut by a spur gear system.

3. The vehicle ride height adjustment system according to claim 2, the spur gear system includes a first spur gear connected to an output shaft of the drive motor and a second spur gear fixed to the nut.

4. The vehicle ride height adjustment system according to claim 3, wherein the spur gear system further includes a reduction gear assembly including a third spur gear in driving engagement with the first spur gear, a fourth spur gear is rotatably fixed to the third spur gear and in driving engagement with the second spur gear.

5. The vehicle ride height adjustment system according to claim 1, wherein the drive motor is drivingly connected to the nut by a worm gear system.

6. The vehicle ride height adjustment system according to claim 1, wherein the ball screw is fixed to a cylinder of the shock absorber.

7. The vehicle ride height adjustment system according to claim 1, wherein the suspension system includes a lower control arm connected to the chassis and to the wheel and height adjustment mechanism is connected to the lower control arm.

8. The vehicle ride height adjustment system according to claim 1, wherein the wheel is mounted to a wheel hub and the height adjustment mechanism is connected to the wheel hub.

9. A vehicle ride height adjustment system, comprising:
a vehicle chassis;
a wheel connected to the vehicle chassis by a suspension system; and
a shock absorber and spring assembly connected to the vehicle chassis and the shock absorber and spring assembly connected to the suspension system by a height adjustment mechanism that includes a ball screw connected to the shock absorber and a nut drivingly connected to the ball screw and drivingly connected to a drive motor, wherein the nut is supported within a housing by a lower bearing assembly having a lower race engaging the housing and an upper race engaging a lower portion of the nut with a plurality of ball bearings disposed axially between the lower race and the upper race and an upper bearing assembly having an outer diagonal race engaging the housing and an inner diagonal race engaging an upper portion of the nut with a plurality of bearing members disposed between the inner diagonal race and the outer diagonal race, wherein the height adjustment mechanism includes a cap threadedly attached to an upper end of the housing and disposed against the outer diagonal race of the upper bearing.

10. The vehicle ride height adjustment system according to claim 9, wherein the drive motor is drivingly connected to the nut by a spur gear system.

11. The vehicle ride height adjustment system according to claim 10, the spur gear system includes a first spur gear connected to an output shaft of the drive motor and a second spur gear fixed to the nut.

12. The vehicle ride height adjustment system according to claim 11, wherein the spur gear system further includes a reduction gear assembly including a third spur gear in driving engagement with the first spur gear, a fourth spur gear is rotatably fixed to the third spur gear and in driving engagement with the second spur gear.

13. The vehicle ride height adjustment system according to claim 9, wherein the drive motor is drivingly connected to the nut by a worm gear system.

14. The vehicle ride height adjustment system according to claim 10, wherein the ball screw is fixed to a cylinder of the shock absorber.

15. The vehicle ride height adjustment system according to claim 9, wherein the suspension system includes a lower control arm connected to the chassis and to the wheel and height adjustment mechanism is connected to the lower control arm.

16. The vehicle ride height adjustment system according to claim 9, wherein the wheel is mounted to a wheel hub and the height adjustment mechanism is connected to the wheel hub.

* * * * *